United States Patent
Maguire

(10) Patent No.: US 10,308,438 B1
(45) Date of Patent: Jun. 4, 2019

(54) CONTROL APPARATUS FOR CONVEYOR OF PARTICULATE MATERIAL

(71) Applicant: MAGUIRE SUPER-SHIELD LTD., Lucan (CA)

(72) Inventor: Dennis R. Maguire, Lucan (CA)

(73) Assignee: MAGUIRE SUPER-SHIELD LTD., Lucan, Ontario (CA)

( * ) Notice: Subject to any disclaimer, the term of this patent is extended or adjusted under 35 U.S.C. 154(b) by 0 days.

(21) Appl. No.: 15/968,831

(22) Filed: May 2, 2018

Related U.S. Application Data

(60) Provisional application No. 62/611,667, filed on Dec. 29, 2017.

(51) Int. Cl.
*B65G 15/14* (2006.01)
*B65G 19/18* (2006.01)

(52) U.S. Cl.
CPC ............. *B65G 19/18* (2013.01); *B65G 15/14* (2013.01); *B65G 2201/045* (2013.01); *B65G 2207/08* (2013.01); *B65G 2812/02217* (2013.01)

(58) Field of Classification Search
CPC .............. B65G 19/18; B65G 2201/045; B65G 2207/08; B65G 2812/02217; B65G 15/14; B65G 15/16; B65G 15/18; B65G 31/02
USPC ..... 198/626.1–626.6, 638–642, 836.1–836.2
See application file for complete search history.

(56) References Cited

U.S. PATENT DOCUMENTS

| | | | |
|---|---|---|---|
| 2,812,052 A | 11/1957 | Doyer | |
| 3,802,549 A * | 4/1974 | Kinsey | B65G 15/14 198/404 |
| 3,910,405 A | 10/1975 | Couperus et al. | |
| 3,915,291 A * | 10/1975 | Vogts | B29C 31/00 198/626.1 |
| 4,457,422 A | 7/1984 | Hurd | |
| 4,776,451 A | 10/1988 | Gaddis | |
| 6,296,107 B1 * | 10/2001 | Baumgartner-Pichelsberger | B29C 47/34 198/626.5 |
| 6,305,896 B1 | 10/2001 | Szentimery | |
| 7,611,141 B2 * | 11/2009 | Williams | G07B 17/00467 198/626.4 |
| 2005/0269187 A1 * | 12/2005 | Jenkins | B29C 47/34 198/626.5 |
| 2010/0193332 A1 | 8/2010 | Beyerer et al. | |
| 2014/0308886 A1 * | 10/2014 | Schwarz | A22C 25/08 452/127 |

* cited by examiner

Primary Examiner — Mark A Deuble

(57) ABSTRACT

A control apparatus for use with a stone spreader vehicle improves the control of particulate material travelling on a conveyor. The control apparatus has an endless belt supported about a plurality of rollers, a capture volume at its leading edge for receiving the incoming particulate material on the conveyor, and a release volume at its trailing edge for releasing the particulate material from the control apparatus.

7 Claims, 2 Drawing Sheets

US 10,308,438 B1

CONTROL APPARATUS FOR CONVEYOR OF PARTICULATE MATERIAL

CROSS-REFERENCE TO RELATED APPLICATIONS

The present application claims the benefit of U.S. provisional patent application No. 62/611,667 filed Dec. 29, 2017, which is incorporated herein by reference in its entirety.

FIELD OF THE INVENTION

The present invention relates to an apparatus to control the conveyance of particulate material along a conveyor belt.

BACKGROUND

Conveyors for moving particulate material, such as stone, sand, or gravel, are well known. One particular mobile application where a conveyor is used to convey particulate material is a specialized vehicle known as a stone spreader. A stone spreader vehicle is used to deliver particulate material to a job site for distribution to specific locations remote from the vehicle by means of a conveyor, which is an integral part of the vehicle. The conveyor enables the particulate material to be directed and thrown to a desired location. The use of a control apparatus in combination with the conveyor can significantly increase the throwing distance of particulate material, which has led to their adoption for use with most stone spreader vehicles.

A control apparatus, such as a Super-Shield™ assembly, facilitates the control of the particulate material on the conveyor. Exemplary control apparatuses are described in U.S. Pat. Nos. 6,341,076 B1, 6,615,976 B2, and 6,695,125 B1 by the present inventor. Despite the control apparatus' effectiveness in facilitating the control of particulate material on the conveyor belt, performance may be improved in two respects.

Firstly, the intake of the control apparatus may be improved so as to reduce bouncing, jittering, and vibration of the control apparatus as a result of the variable particle size of the particulate material moving on the conveyor. Secondly, the outlet of the control apparatus may be improved so as to reduce disturbance of the particulate material moving on the conveyor as it is released from the control apparatus.

Accordingly, there is a need to improve the performance and efficiency of control apparatuses.

SUMMARY OF THE INVENTION

A control apparatus, according to the present invention, for controlling the conveyance of particulate material on a conveyor, comprising:
a. a leading edge and a trailing edge;
b. a frame;
c. a plurality of horizontally aligned intermediate rollers rotatably attached to the frame;
d. a leading edge roller rotatably attached to the frame forward and above the plurality of intermediate rollers at a first angle;
e. a trailing edge roller rotatably attached to the frame rearward and above the plurality of intermediate rollers at a second angle;
f. an endless belt mounted and supported on the leading edge roller, trailing edge roller and plurality of intermediate rollers;
g. a capture volume beneath the endless belt at the leading edge of the frame; and
h. a release volume beneath the endless belt at the trailing edge of the frame.

In another embodiment, the capture volume is a wedge-shaped volume between the endless belt and the conveyor defined by the first angle and the release volume is a wedge-shaped volume between the endless belt and the conveyor defined by the second angle.

In another embodiment of the present invention, the first angle is 19°.

In another embodiment of the present invention, the second angle is 14°.

In another embodiment of the present invention, a pivoting linkage connects the control apparatus to the frame of the conveyor for permitting vertical movement of the control apparatus between a lowered position in which the endless belt rests on the conveyor to a raised position with respect to the conveyor.

In another embodiment of the present invention, the control apparatus has a motor operationally engaged with one of the leading edge roller, the trailing edge roller, or the plurality of intermediate rollers to drive the endless belt.

In another embodiment of the present invention, the motor is operationally engaged with the leading edge roller.

BRIEF DESCRIPTION OF THE DRAWINGS

In order that the invention may be more clearly understood, a preferred embodiment thereof will now be described by way of example, with reference to the accompanying drawings, in which.

DESCRIPTION OF THE PREFERRED EMBODIMENT

Figure 1:
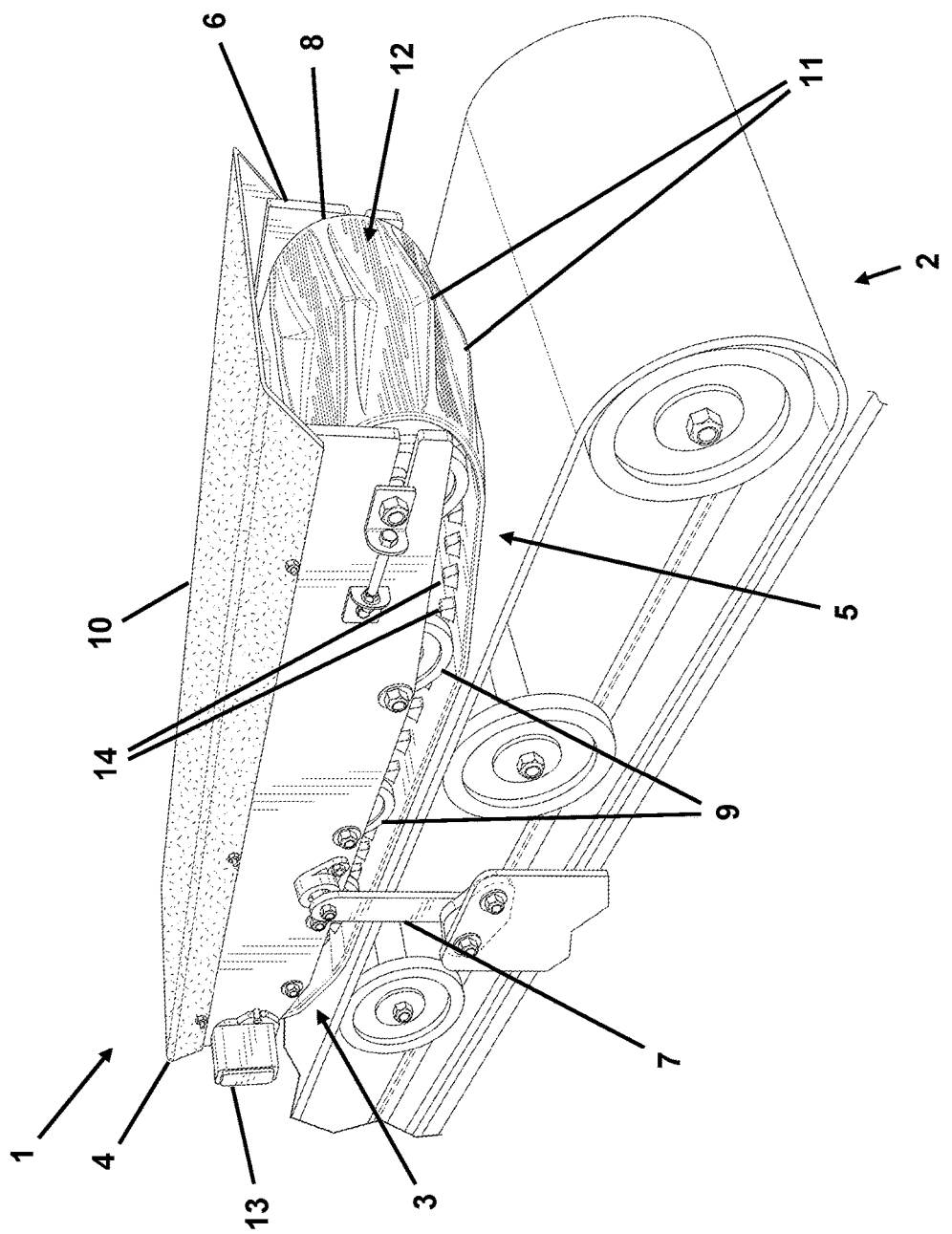
FIG. 1 is a perspective view of a control apparatus, according to the present invention, positioned on a conveyor.

A control apparatus 1, according to the present invention, for use with a stone spreader vehicle improves the control of particulate material travelling on a conveyor 2. The control apparatus 1 has a capture volume 3 at its leading edge 4 for receiving the incoming particulate material on the conveyor 2 and a release volume 5 at its trailing edge 6 for releasing the particulate material from the control apparatus 1.

The control apparatus 1 is pivotally mounted above the conveyor 2 by means of a linkage 7 to permit vertical elevation of the control apparatus 1 with respect to the conveyor 2 to accommodate the thickness of the particulate material deposited onto the moving conveyor 2 upstream of the control apparatus 1 from the storage area of the stone spreader. The particulate material travels on the conveyor 2, in a particulate stream, towards the capture volume 3 of the control apparatus 1.

Figure 2:
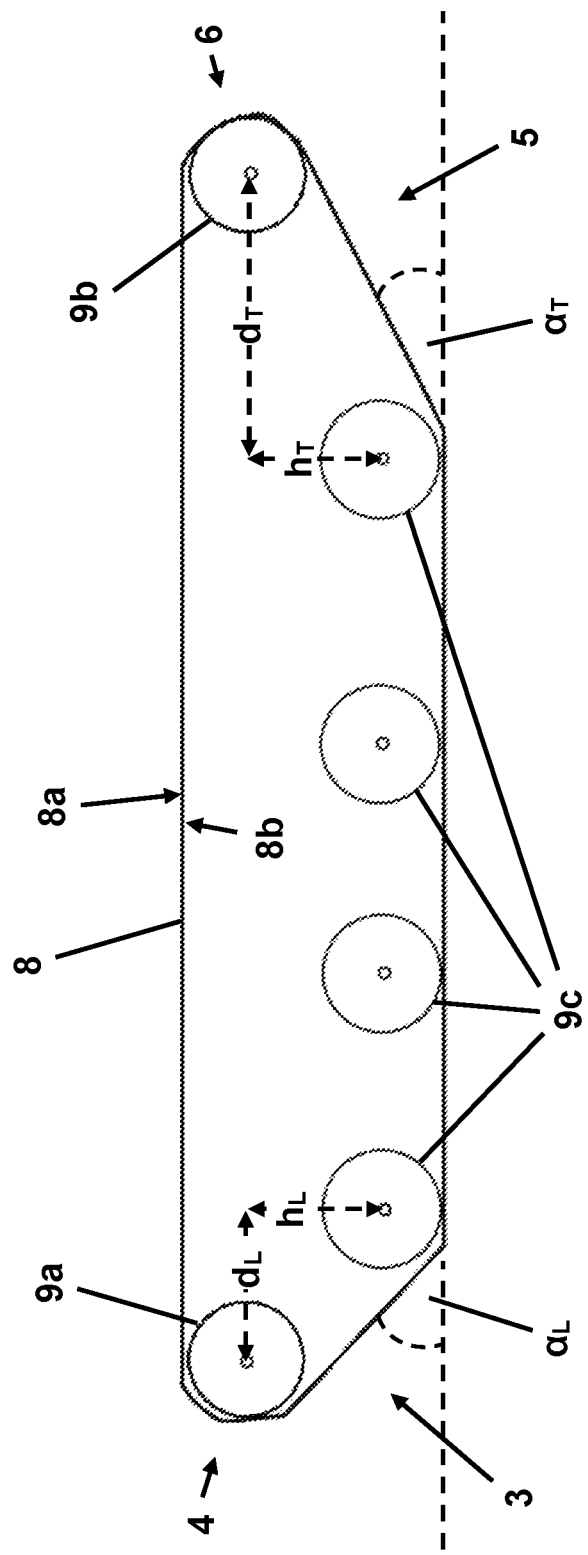
FIG. 2 is a schematic side view of a control apparatus, showing the first and second angles.

Referring to FIG. 2, the control apparatus 1 comprises an endless belt 8, mounted and supported on rollers 9 between the side frame elements of a frame 10. The frame 10 is preferably made from sheet metal, such as steel, aluminum, or other suitably strong and durable material.

The control apparatus 1 has a leading edge roller 9a and a trailing edge roller 9b and a plurality of horizontally aligned intermediate rollers 9c that extend beyond the bottom of the frame 10 to enable the endless belt 8 to contact the particulate stream deposited on the conveyor 2. Although the present description refers to "rollers", the term should be understood to include any driven or passive support wheel or roller suitable for an endless belt, for example, wheels mounted on an axle, idler rollers, or sprockets.

The leading edge roller 9a is mounted on the frame 10 forward of and above the intermediate rollers 9c by the distance $d_L$ and the height $h_L$. The distance $d_L$ and the height $h_L$ determine the angle $\alpha_L$ at which the endless belt 8 will travel between the leading edge roller 9a and the adjacent intermediate roller 9c. Preferably, the distance $d_L$ is about 6½" and the height $h_L$ is about 2¼". The angle $\alpha_L$ is preferably, about 19°.

The distance $d_L$, height $h_L$, and angle $\alpha_L$ define a wedge-shaped capture volume 3 at the leading edge 4 of the control apparatus 1. The particulate material deposited on the conveyor 2, travels along the conveyor 2, and is received in the capture volume 3 of the control apparatus 1. The capture volume 3 is the wedge-shaped space between the endless belt 8 and the conveyor 2 at the leading edge 4 of the control apparatus 1, defined by the angle $\alpha_L$. The particulate material is received in the capture volume 3, which reduces bounce and vibration of the control apparatus 1, during operation.

The trailing edge roller 9b is mounted on the frame 10 rearward of and above the intermediate rollers 9c by the distance $d_T$ and the height $h_T$. The distance $d_T$ and the height $h_T$ determine the angle $\alpha_T$ at which the endless belt 8 will travel between the trailing edge roller 9b and the adjacent intermediate roller 9c. Preferably, the distance $d_T$ is between 11" and 15", more preferably about 13", and the height $h_T$ is about 3¼". The angle $\alpha_T$ is preferably, about 14°.

The distance $d_T$, height $h_T$, and angle $\alpha_T$ define a wedge-shaped release volume 5 at the trailing edge 6 of the control apparatus 1 where the endless belt 8 controls and smoothly releases the particulate stream travelling on the conveyor 2. The release volume 5 is the wedge-shaped space between the endless belt 8 and the conveyor 2 at the trailing edge 6 of the control apparatus 1, defined by the angle $\alpha_T$.

The endless belt 8 preferably has a generally flat outer surface with a plurality of raised flights 11 spaced apart longitudinally thereon. The raised flights 11 may have a generally triangular shape with a peak extending from the outer surface 8a by approximately 1" and sides sloping back towards the outer surface 8a at the side edges of the endless belt 8. Other surface features, such as a tread pattern 12 or other small projections may be used in addition to, or in place or, the raised flights 11 to improve the control of particulate material travelling on the conveyor 2.

The endless belt 8 may be passive and driven by frictional engagement with the conveyor belt 2 and particulate material thereon. Preferably, the endless belt 8 is powered by a motor 13 mounted on the frame 10. Whether passive or powered, the endless belt 8 preferably has teeth 14, or other suitable structures, along its inner surface 8b to engage with a complementary gear or sprocket of at least one of the leading edge roller 9a, intermediate rollers 9c, or trailing edge roller 9b. When powered by a hydraulic motor, the motor 13 is operatively engaged with one of the rollers 9, so as to selectively drive rotation of the roller 9. Preferably, the motor 13 is engaged with the leading edge roller 9a and is attached to the frame 10 adjacent the leading edge 4 of the side frame elements, near the leading edge roller 9a. In this configuration, the motor 13 is raised above the particulate material travelling on the conveyor 2 and is less likely to be damaged by particulate material travelling on the conveyor 2.

The control apparatus 1 is mounted above the conveyor 2 by way of a pivoting linkage 7 between the conveyor structure and the side frame elements of the control apparatus 1. A spring, or other biasing system, may be used to bias the control apparatus 1 downwardly onto the conveyor 2, so as to maintain a desired amount of pressure on the particulate material as it flows between the endless belt 8 and the conveyor 2. The pivoting linkage 7 permits the control apparatus 1 to move upwardly and downwardly above the conveyor 2 so as to accommodate variations in size of the particulate material travelling thereon. Undesirable movements in the control apparatus 1, such as roll, may be restricted by the pivoting linkage 7. For example, relative movement of the pivoting linkages 7 on either side of the control apparatus 1 may be restricted, so that both pivoting linkages 7 move upwardly and downwardly in sync with one another, thereby restricting roll of the control apparatus 1.

In operation, a preferred embodiment of the control apparatus 1 having a frame 10, a leading edge roller 9a, a trailing edge roller 9b, a plurality of horizontally aligned intermediate rollers 9c, and an endless belt 8 is mounted above a conveyor 2 by way of a pivoting linkage 7. The endless belt 8 is driven by a motor 13 operatively engaged with the leading edge roller 9a. The particulate material in a storage container or reservoir of the stone spreader vehicle is deposited onto the surface of the moving conveyor 2 upstream from the capture volume 3 at the leading edge 4 of the control apparatus 1. The conveyor 2 and endless belt 8 are operated using a control device to synchronize their speeds and the particulate material travels along the surface of the conveyor 2 and enters the capture volume 3. The angle $\alpha_L$ is about 19°, such that the particulate material initially contacts the endless belt 8 in the capture volume 3. The particulate material then travels between the endless belt 8 and the conveyor 2 until it reaches the release volume 5 at the trailing edge 6 of the control apparatus 1. The angle $\alpha_T$ is about 14°, so as to minimize any disturbance of the particulate material at the trailing edge roller 9b. The control apparatus thereby facilitates the control of the particulate material travelling on the conveyor 2.

The present invention has been described and illustrated with reference to an exemplary embodiment, however, it will be understood by those skilled in the art that various changed may be made and equivalents may be substituted for elements thereof without departing from the scope of the invention as set out in the following claims. Therefore, it is intended that the invention not be limited to the particular embodiments disclosed herein.

What is claimed is:

1. A control apparatus for controlling the conveyance of particulate material on a conveyor, comprising:
   a leading edge and a trailing edge;
   a frame;
   a plurality of horizontally aligned intermediate rollers rotatably attached to the frame;
   a leading edge roller rotatably attached to the frame forward and above the plurality of intermediate rollers;
   a trailing edge roller rotatably attached to the frame rearward and above the plurality of intermediate rollers;
   an endless belt mounted and supported on the leading edge roller, trailing edge roller, and plurality of intermediate rollers;
   a capture volume beneath the endless belt at the leading edge of the frame; and
   a release volume beneath the endless belt at the trailing edge of the frame;
   wherein the plurality of intermediate rollers define a plane and the endless belt forms a first angle between the leading edge roller and the adjacent intermediate roller and a second angle between the trailing edge roller and the adjacent intermediate roller relative to the plane; and wherein the first angle is greater than the second angle.

2. The control apparatus of claim 1, wherein the capture volume is a wedge-shaped volume between the endless belt and the conveyor defined by the first angle and the release volume is a wedge-shaped volume between the endless belt and the conveyor defined by the second angle.

3. The control apparatus of claim 2, wherein the first angle is 19°.

4. The control apparatus of claim 2, wherein the second angle is 14°.

5. The control apparatus of claim 2, comprising a pivoting linkage connecting the control apparatus to the conveyor for permitting vertical movement of the control apparatus between a lowered position in which the endless belt rests on the conveyor to a raised position in which the endless belt is spaced apart from the conveyor.

6. The control apparatus of claim 2, comprising a motor operationally engaged with one of the leading edge roller, the trailing edge roller, or the plurality of intermediate rollers to drive the endless belt.

7. The control apparatus of claim 6, wherein the motor is operationally engaged with the leading edge roller.

* * * * *